Patented Jan. 10, 1939

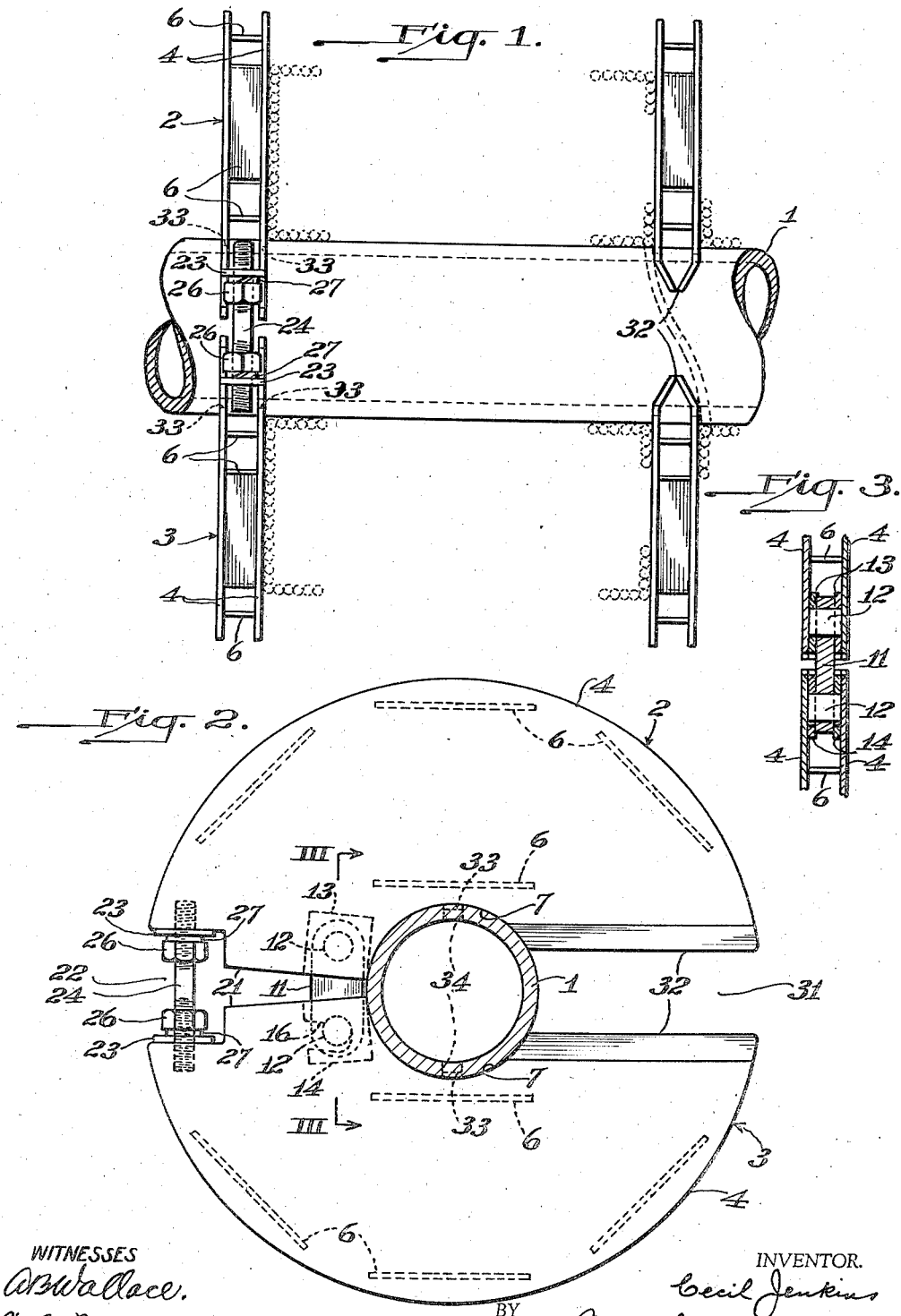

2,143,734

UNITED STATES PATENT OFFICE 2,143,734

SPOOL ARM

Cecil Jenkins, Tulsa, Okla., assignor to Lee C. Moore & Company, Inc., Pittsburgh, Pa., a corporation of Pennsylvania Application June 29, 1938, Serial No. 216,488

6 Claims. (Cl. 242—117)

This invention relates to spool arms or flanges such as are used on a shaft or drum of a well-drilling rig to form a spool that receives the cable to which are attached the tools that are lowered into the well.

Various types of spool arms are used, but substantially all of them are made in sections which are clamped on the drum by means of bolts or threaded rods that connect the sections together on opposite sides of the drum. As it is necessary to wind the reserve supply of cable on the drum outside of the spool arms, the cable must pass through one of the arms from one side to the other. With a commonly used type of spool arm the cable passes through it in the space between its sections, but in so doing it has to pass over one of the connecting bolts and is therefore apt to kink, which is very undesirable.

It is among the objects of this invention to provide a spool arm of relatively simple and inexpensive construction which is provided with an unobstructed space for a cable to pass from one side of it to the other, which can be readily loosened on the drum and shifted to various positions, and which can be easily clamped on the drum or removed therefrom entirely.

In accordance with this invention, a spool arm is formed from a pair of panels, preferably hollow, disposed in substantially the same plane and adapted to receive a rotatable drum between them. The panels are hinged together at one side of the drum to permit them to have a jaw-like movement, and on the same side of the drum they are provided with means for effecting the jaw-like movement so that they will clamp onto the drum. The inner edges of the two panels on the opposite side of the drum are spaced apart, and, as the hinge and clamping means are disposed on the other side of the drum, this space is wholly unobstructed. Consequently, a cable which passes through the slot thus formed from one side of the spool arm to the other may lie flat against the drum without having any bolt or the like to pass over. Preferably, the hinge is placed closely adjacent the drum and is so formed as to be readily detachable from one of the panels so that they can be easily removed from the drum if desired. The means for effecting the clamping action of the panels is located adjacent their peripheries and preferably comprises a threaded stud bolt that extends into both panels and on which nuts are threaded for forcing the adjoining portions of the panels apart.

The preferred embodiment of the invention is illustrated in the accompanying drawing in which Fig. 1 is a side view of a spool having arms constructed in accordance with my invention; Fig. 2 is a side view of one of the spool arms as viewed from the center of the spool; and Fig. 3 is a vertical section through the hinge structure taken on the line III—III of Fig. 2.

Referring to the drawing, a metal drum 1, preferably formed from a hollow metal shaft, is journaled in the usual bearings (not shown) and is connected in the usual way with the oil-well machinery that rotates it. Mounted on the drum at a distance apart to give the desired size spool are two spool arms each of which is formed from a pair of panels 2 and 3 that are preferably made hollow by building them up from parallel plates 4 spaced apart by spacing plates 6 welded between them. Each panel is provided in its inner edge with an arcuate recess 7 for receiving a portion of the drum.

In accordance with this invention the two panels of each spool arm are hinged together at one side of the drum to permit them to have a jaw-like movement relative to the drum between them, and means is also provided for effecting this jaw-like movement so that the panels can be clamped onto the drum. Accordingly, as shown in Figs. 2 and 3, the two panels are pivotally connected together by means of a link 11 having a pin 12 projecting through each end and pivotally mounted in openings in bearing plates welded to the inner faces of panel plates 6. The upper pair of bearing plates 13 permanently connects the upper end of the link to panel 2 in this manner, but the lower set of bearing plates 14 is provided with lateral slots 16 entering their pin-receiving openings so that the lower hinge link pin can be slipped in and out of the openings in these plates to permit panel 3 to be entirely disconnected from the upper panel to permit the spool arm to be assembled or disassembled.

It is another feature of this invention that all of the connecting means between the two panels are disposed on one side of the drum so that an unobstructed space between the inner edges of the panels on the opposite side of the drum may be formed. Accordingly, hinge link 11 is preferably disposed closely adjacent the drum, while panel-spreading means is connected to the panels adjacent their peripheries to cause them to pivot on hinge pins 12 and clamp onto the drum. To permit this jaw-like movement of the panels, their adjacent inner edges 21 on the hinge side of the drum are inclined away from each other as they leave the drum. At a point in the neighborhood of the periphery of the spool arm the panels are recessed to provide a larger space 22 between them. Welded across plates 6 of each panel in this recess is a small tie member 23 provided with an opening. Slidably mounted in these openings in these tie members are the opposite ends of a stud bolt 24 on which a pair of nuts 26 is threaded. By turning these nuts outwardly on the stud bolt against washers 27 that bear against tie members 23, the adjacent portions of the panels are spread apart so that the arcuate inner edges 7 of the panels grip the drum.

On the opposite side of the drum the inner edges of the two panels are spaced apart to form an open-ended slot 31 having substantially parallel side walls 32, as shown in Fig. 2. As the clamping and hinge members are disposed on the other side of the drum, this slot is unobstructed by any panel-connecting means. Consequently, the cable wound on the drum, and indicated by broken lines in Fig. 1, can pass through this slot and lie flat against the drum so that it will not kink. The edge portions of panel plates 6 bordering the slot are preferably turned inwardly so that the slot walls 32 are tapered in cross-section, as shown in Fig. 1 thereby eliminating sharp corners of the panels for the cable to pass around.

To more securely hold the spool arm in position, the arcuate drum-receiving recesses 7 in the inner edges of its panels are provided with small lugs 33 that project into holes 34 in the drum located at predetermined intervals along its length. By merely loosening nuts 26 on bolt 24, the panels can be separated far enough to free these lugs from the holes, and then the entire spool arm can be moved along the drum in either direction to similar holes in another location in order to vary the length of the spool.

According to the provisions of the patent statutes, I have explained the principle and construction of my invention, and have illustrated and described what I now consider to be its best embodiment. However, I desire to have it understood that, within the scope of the appended claims, the invention may be practiced otherwise than as specifically illustrated and described.

I claim:

1. A spool arm comprising a pair of panels disposed in substantially the same plane and adapted to receive a drum between them, means hinging said panels together at one side of the drum for jaw-like movement, and means on the same side of the drum entirely within the periphery of the spool arm for effecting said jaw-like movement of the panels to clamp them on said drum, the adjacent edges of the panels on the opposite side of the drum being spaced apart to form an unobstructed space for a cable to pass from one side of the spool arm to the other.

2. A spool arm comprising a pair of panels disposed in substantially the same plane and adapted to receive a drum between them, means closely adjacent one side of the drum for hinging said panels together for jaw-like movement, and means on the same side of the drum adjacent the peripheries of the panels for effecting said jaw-like movement of the panels to clamp them on said drum, the adjacent edges of the panels on the opposite side of the drum being spaced apart to form an unobstructed space for a cable to pass from one side of the spool arm to the other.

3. A spool arm comprising a pair of panels disposed in substantially the same plane and adapted to receive a drum between them, means hinging said panels together at one side of the drum for jaw-like movement, a stud bolt on the same side of the drum having its ends slidably mounted in said panels, and nuts threaded on said bolt between the panels for forcing them apart to cause them to clamp on said drum, the adjacent edges of the panels on the opposite side of the drum being spaced apart to form an unobstructed space for a cable to pass from one side of the spool arm to the other.

4. A spool arm comprising a pair of panels disposed in substantially the same plane and adapted to receive a drum between them, means hinging said panels together at one side of the drum for jaw-like movement, and means on the same side of the drum entirely within the periphery of the spool arm for effecting said jaw-like movement of the panels to clamp them on said drum, the adjacent edges of the panels on the opposite side of the drum being spaced apart to form an unobstructed space for a cable to pass from one side of the spool arm to the other, said edges being tapered toward each other.

5. A spool arm comprising a pair of panels disposed in the same plane and provided in their inner edges with arcuate recesses for receiving a drum, lugs projecting from the walls of said recesses and adapted to project into holes in said drum, means hinging said panels together at one side of the drum for jaw-like movement, and means on the same side of the drum for effecting said jaw-like movement of the panels to clamp them on said drum, the adjacent edges of the panels on the opposite side of the drum being spaced apart to form an unobstructed space for a cable to pass from one side of the spool arm to the other.

6. A spool arm comprising a pair of hollow panels disposed in substantially the same plane and adapted to receive a drum between them, a link extending into the panels with its ends hinged therein to permit jaw-like movement of the panels, a stud bolt extending into the panels, and nuts threaded on the bolt between the panels for forcing them apart to cause them to clamp on said drum, the inner edges of the panels on the opposite side of the drum being spaced apart to form an unobstructed space for a cable to pass from one side of the spool arm to the other.

CECIL JENKINS.